United States Patent [19]
Bialek et al.

[11] Patent Number: 6,136,363
[45] Date of Patent: Oct. 24, 2000

[54] POURABLE EDIBLE AQUEOUS-CONTINUOUS EMULSIONS

[75] Inventors: Jadwiga Malgorzata Bialek; Malcolm Glyn Jones; Ian Timothy Norton, all of Bedford, United Kingdom

[73] Assignee: Lipton, division of Conopco, Inc., Englewood Cliffs, N.J.

[21] Appl. No.: 09/108,666

[22] Filed: Jul. 1, 1998

[30] Foreign Application Priority Data

Jul. 11, 1997 [EP] European Pat. Off. ............ 97305151
Jul. 15, 1997 [GB] United Kingdom .................. 9714898

[51] Int. Cl.$^7$ ....................................................... A23L 1/05
[52] U.S. Cl. .......................... 426/573; 426/575; 426/577; 426/578
[58] Field of Search .................................... 426/602, 573, 426/575, 578, 574, 576, 590

[56] References Cited

U.S. PATENT DOCUMENTS

| | | | |
|---|---|---|---|
| 5,082,684 | 1/1992 | Fung | 426/613 |
| 5,213,834 | 5/1993 | Ikeda | 426/578 |
| 5,308,639 | 5/1994 | Fung | 426/613 |
| 5,324,531 | 6/1994 | Hoefler | 426/575 |
| 5,360,624 | 11/1994 | Okura | 426/570 |
| 5,370,894 | 12/1994 | Singer | 426/570 |
| 5,458,904 | 10/1995 | Zolper | 426/575 |
| 5,508,055 | 4/1996 | Rubow | 426/573 |
| 5,576,039 | 11/1996 | Lewis | 426/573 |
| 5,626,901 | 5/1997 | Ambjerg Pedersen | 426/573 |
| 5,738,897 | 4/1998 | Gidley | 426/573 |

FOREIGN PATENT DOCUMENTS

| | | |
|---|---|---|
| 355 908 | 2/1990 | European Pat. Off. . |
| 501 758 | 9/1992 | European Pat. Off. . |
| 91/02463 | 3/1991 | WIPO . |
| 93/17582 | 9/1993 | WIPO . |
| 96/02151 | 2/1996 | WIPO . |

OTHER PUBLICATIONS

European Search Report in the European patent application of 97305151 dated Dec. 17, 1997.
International Search Report in the International patent application of PCT/EP 98/04030 dated Nov. 17, 1998.

*Primary Examiner*—Carolyn Paden
*Attorney, Agent, or Firm*—James J. Farrell

[57] ABSTRACT

A pourable, edible, low- or zero-fat emulsion comprising a continuous non-gelled aqueous phase and a dispersed phase of gel particles, wherein the gel particles occupy from 20 to 70% of the volume of the aqueous phase and the gel particles comprise hard particles of biopolymer gel and/or soft particles of biopolymer gel.

13 Claims, 1 Drawing Sheet

POURABLE EDIBLE AQUEOUS-CONTINUOUS EMULSIONS

FIELD OF THE INVENTION

The present invention relates to pourable, edible, aqueous-continuous emulsions. In particular it relates to low- or zero-fat, pourable, edible, aqueous-continuous emulsions.

BACKGROUND ART

Traditional pourable, edible, aqueous-continuous emulsions such as dressings and sauces are prepared using high levels of fat (eg 60% fat). In view of a need to reduce fat intake in many parts of the world, an increasing number of consumers prefer low- or zero-fat food products. However, it is difficult for manufacturers of low- or zero-fat products to replicate the desired flavour and fatty mouthfeel of full-fat products. This difficulty is particularly a problem in low- or zero-fat, pourable, edible, aqueous-continuous emulsions.

When fat is removed from an emulsion, it is preferably replaced by a component or structuring system which exhibits fat functionality and provides a fatty mouthfeel. There have been many attempts to find such fat-replacers. For example, thickeners such as xanthan gum are used, but these have a slimy rather than a fatty mouthfeel.

The present invention seeks to provide an improved pourable, edible, aqueous-continuous emulsion.

This is achieved by providing a pourable emulsion comprising a dispersion of gel particles in a continuous aqueous phase.

The aqueous phase is not gelled. The phase volume of the gel particles in the aqueous phase is important.

EP 355908 discloses a spreadable, water-continuous composition comprising non-aggregated microgels containing a gelling polysaccharide in an amount capable of forming a reversible gel. When the composition is a water-continuous spread, it is prepared by dissolving the water-soluble ingredients including the gelling polysaccharide in water, adding melted fat and shearing the mixture while cooling it through the setting temperature of the gelling polysaccharide.

In the resulting spread, substantially all of the water is contained within the microgels such that the gel particles occupy approximately 100% of the volume of the aqueous phase, thereby contributing to its spreadability.

WO 96/02151 discloses a pourable acidic dressing comprising 0–50 wt % of fat, 46–99 wt % of water, pieces of vegetables, herbs and/or spices of a visible size and 0.1–4 wt % of one or more non-starch polysaccharides present in a sheared gel form. The dressing is prepared under conditions which result in the polysaccharide gel occupying approximately 100% of the volume of the aqueous phase. Consequently, the dressing is able to suspend the pieces of vegetables, herbs and/or spices for prolonged periods of time.

SUMMARY OF THE INVENTION

In accordance with the present invention, there is provided a pourable, edible emulsion comprising a continuous non-gelled aqueous phase and a dispersed phase of gel particles, wherein the gel particles occupy from 20 to 70% of the volume of the aqueous phase and the gel particles comprise hard particles of biopolymer gel and/or soft particles of biopolymer gel.

The emulsion preferably comprises from 0 to 20 wt %, more preferably from 0 to 10 wt % of a dispersed phase of fat. This dispersed phase comprises fat droplets which preferably have a mean diameter of from 1 to 5 microns. It is desirable for some fat to be present to impart flavour. For the purpose of the present invention, the definition of fat includes liquid oil, crystallising fat blends and fat mimics such as sucrose polyesters.

All wt % given in this specification are % by weight of the emulsion unless indicated otherwise.

The phase volume of the gel particles is important in providing a low- or zero-fat emulsion which is pourable and has a viscosity which is the same as or is similar to the viscosity of a pourable, full-fat emulsion. Preferably, the gel particles occupy from 30 to 60% of the volume of the aqueous phase, more preferably from 40 to 60%.

In order to be an effective fat-replacer in low- or zero-fat emulsions, it is also important that the dispersion of gel particles comprises hard and/or soft particles of biopolymer gel. The soft particles provide mouthfeel (eg creaminess, oiliness) and mouthcoating properties similar to fat. The hard particles provide a desirable firm texture when the emulsion is first tasted and before it is subjected to oral breakdown. Preferably, both hard and soft gel particles are present.

In the emulsion of the present invention, when both hard and soft gel particles are present, the ratio of hard particles to soft particles may be from 4:1 to 1:4, preferably from 2:1 to 1:2; more preferably approximately 1:1.

According to another aspect of the present invention, there is provided a process for preparing a pourable, edible emulsion comprising the steps of:

a) preparing hard particles of biopolymer gel and/or soft particles of biopolymer gel; and b) admixing a non-gelled aqueous phase and the hard particles and/or the soft particles to form an emulsion comprising a continuous non-gelled aqueous phase and a dispersed phase of particles of biopolymer gel occupying from 20 to 70% of the volume of the aqueous phase.

It is important that the hard and soft particles of biopolymer gel are prepared (either together or separately) before they are mixed with a non-gelled aqueous phase. In the resulting emulsion, the relative volumes of the non-gelled aqueous phase and the particles of biopolymer gel dictate the phase volume of these gel particles.

The process of the present invention provides flexibility by allowing the phase volume of the gel particles to be adjusted, thereby varying the viscosity of the resulting emulsion. For example, the phase volume of the gel particles is decreased by increasing the relative volume of the non-gelled aqueous phase in the emulsion.

If instead the hard particles and soft particles are prepared in the presence of substantially all the aqueous phase of the final emulsion, the gel particles occupy approximately 100% of the volume of the aqueous phase, resulting in an emulsion which is too viscous.

The emulsion of the present invention is pourable; it is not spoonable.

Preferably, the emulsion has a Brookfield viscosity of from 1000 to 30000 cps, more preferably from 5000 to 15000 cps. These viscosities correspond to those of pourable emulsions such as dressings and sauces.

Brookfield viscosity is a common viscosity parameter and is determined by taking the viscosity after shearing for 1 minute at 10 rpm using a Brookfield DV-I+™ viscometer fitted with an RV no. 4 spindle set.

The emulsion of the present invention preferably has an elastic modulus G' of from 200 to 600 Pa, more preferably from 300 to 500 Pa. This provides an initial thickness which contributes to the desired oral breakdown profile. It is determined by performing an oscillatory frequency ramp from 0.01 to 10 Hz using a Carrimed CSL™ 500 rheometer and standard geometries, and determining the G' value at the plateau region of the obtained curve.

The determination of viscosity and elastic modulus is made at a temperature of normal product usage; generally this is 5-35EC but typically it is 18-25EC.

Preferably, to prepare the gel particles, at least one soft-gelling biopolymer and at least one hard-gelling biopolymer are dispersed in water; this dispersion is heated to a temperature above the gel transition temperatures of the biopolymers and cooled under shear to a temperature below the gel transition temperatures of the biopolymers. Hard and soft gel particles are formed having a mean diameter of from about 0.1 to 100 microns, more preferably from about 0.1 to 50 microns. Alternatively, at least one soft-gelling biopolymer and/or at least one hard-gelling biopolymer are dispersed separately in water and are separately heated and cooled under shear.

The resulting sheared gel is substantially less rigid than a corresponding gel formed under quiescent conditions (ie heated and cooled in the absence of shear). This is because shearing disrupts the formation of a continuous biopolymer gel network.

Processes for preparing water-continuous compositions comprising gel particles formed under shear are disclosed in EP 0355908, the contents of which are incorporated herein by reference.

As defined in EP 0355908, the gel transition temperature of a gelling-biopolymer is the temperature at which, upon slow temperature increase, the ordered form, be it microscopic or macroscopic, of the biopolymer has completely disappeared. This temperature can be measured using differential scanning calorimetry.

The amount of shear applied to the dispersion influences the size of the resulting gel particles. Generally a relatively high shear is used. The amount of shear to be applied can be found by those skilled in the art using routine trial and error.

Shear can be applied by various means, for example a homogeniser, a high shear mixer, a votator or a scraped surface heat exchanger.

Other methods for preparing the gel particles include gelling at least one hard-gelling biopolymer and/or at least one soft-gelling biopolymer under quiescent conditions (either together or separately) and subsequently shearing the gel, or gelling a dispersed aqueous phase of a water in oil emulsion, where the aqueous phase contains at least one hard-gelling biopolymer and/or at least one soft-gelling biopolymer, and subsequently separating the gel particles from the oil continuous phase.

In a preferred embodiment of the present invention, more than 90% of the hard gel particles have a diameter of from 0.1 to 30 microns, preferably more than 90% of the hard gel particles have a diameter of from 0.1 to 10 microns. When the hard gel particles have diameters which exceed these upper limits, they are more readily detected in the mouth.

Preferably, the soft gel particles have a mean diameter of from 2 to 50 microns.

Examples of gelling biopolymers which form a hard gel are kappa-carrageenan and agar.

Examples of gelling biopolymers which form a soft gel are iota-carrageenan, gelatinised starch and pectin.

Some biopolymers are capable of forming both hard and soft gels. For example, proteins such as egg and whey form hard gels when heated under acidic conditions and form soft gels when heated under neutral pH conditions or when appropriate ions such as $Ca^{++}$ are added. Also, alginate can form hard gels or soft gels depending on polymer concentration and extent of conversion with calcium. Gellan forms hard gels with ions such as $Ca^{++}$ and soft gels with ions such as $Na^+$.

Throughout this specification, hard particles of biopolymer gel are particles which have an elastic modulus G' of from 1000 to 100000 Pa and soft particles of biopolymer gel are particles which have an elastic modulus G' of from 1 to 1000 Pa. The measurement of the elastic modulus of gel particles is most easily achieved by measuring the elastic modulus of a corresponding gel formed under quiescent conditions; it is assumed that the elastic modulus of the individual gel particles is the same as that of the quiescent gel. (In contrast, sheared gels are less rigid than quiescent gels because the individual gel particles flow past one another.)

The emulsion of the present invention is preferably a dressing or a sauce; the emulsion forms a suitable base for the manufacture of "Italian", "French" or vinaigrette type dressings, or for the preparation of a cream style sauce, for example.

Dressings are edible, aqueous-continuous emulsions with an acid taste. An acidulant is used to add the desired taste and flavour and for microbiological preservation. Suitable acidulants are acetic acid, lactic acid, citric acid and phosphoric acid. The optimum amount of acidulant used is established by sensory evaluation and microbiological stability. It is known that a sensory appreciation has no good correspondence with the pH of the dressing, because ingredients such as proteins may interfere with the perception of acidity.

Sauces are edible, liquid or semi-solid preparations for accompanying foodstuffs such as meat or vegetables.

If desired, the emulsions of the present invention may contain, in addition to the hard and/or soft gel particles, gelling or thickening agents such as non-gelling hydrolysed starch, amylose, dairy proteins, xanthan gum, locust bean gum, guar gum, gum arabic and microcrystalline cellulose. Preferably, the total level of these additional gelling and/or thickening ingredients is 0–10 wt %, more preferably 0–5 wt %, most preferably 0–0.5 wt %.

Optional ingredients of the emulsion of the present invention include flavours, salts, preservatives, vitamins and colouring materials, to be added in amounts which are usual for the type of food product in question. For dressings, suitable amounts are: 0–4 wt % salt (e.g. sodium chloride); 0–4 wt % preservatives (preferably potassium sorbate and sodium benzoate); 0–1 wt % colouring material (e.g. beta-carotene).

The present invention provides a low- or zero-fat emulsion which is pourable and has mouthfeel, mouthcoating and oral breakdown properties which are similar to those of full-fat emulsions.

DETAILED DESCRIPTION OF THE INVENTION

Figure 1:
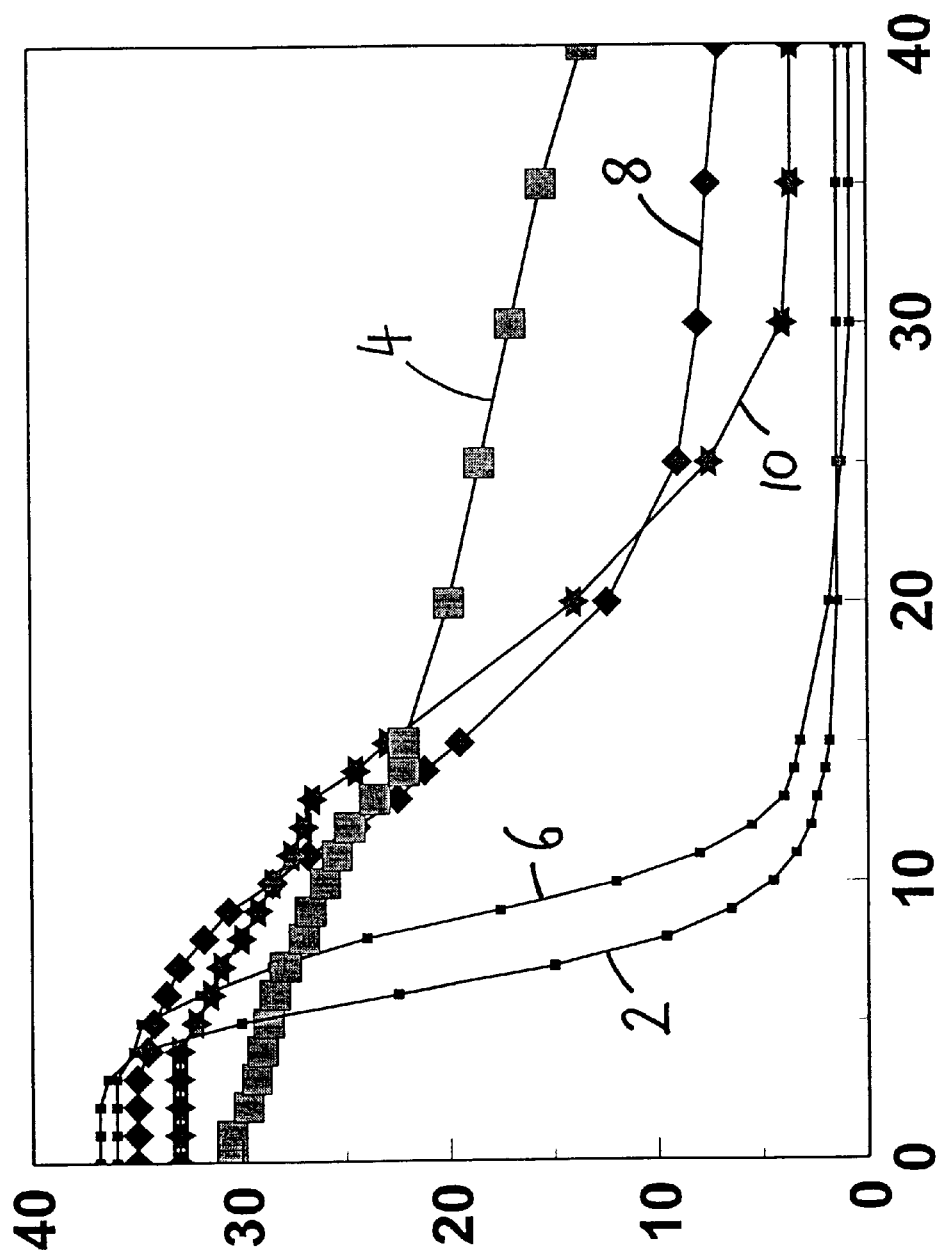

Examples of the products and processes of the invention will now be described to illustrate, but not to limit, the invention, with reference to accompanying FIG. 1.

FIG. 1 is a graph of time in seconds (x axis) against perceived in-mouth viscosity (y axis) showing plots of the oral breakdown of five dressings.

Comparative Example A

A pourable dressing comprising 55% fat and xanthan gum was prepared. A trained sensory expert ate the dressing and measured its in-mouth breakdown profile over 40 seconds using an arbitrary perceived viscosity scale of 0 to 40, where 40 represents the initial viscosity of a full fat dressing.

The resulting oral breakdown plot 2 is shown in FIG. 1.

Comparative Example B

The in-mouth breakdown profile of a commercial zero-fat dressing was measured in accordance with the method used in comparative example A.

The resulting oral breakdown plot 4 is shown in FIG. 1.

EXAMPLES 1–3

A pre-mix of dispersed gel particles was prepared by dispersing 1.25 wt % iota carrageenan, 1.25 wt % kappa carrageenan and 0.500 wt % potassium chloride in 97 wt % water (all by weight of the premix), heating the dispersion to 70° C. and cooling it to 5° C. whilst shearing it through a scraped surface heat exchanger at 2400 rpm.

Separately, the following ingredients were admixed:
0.67% xanthan gum
4.35% buttermilk solids
3.62% sodium chloride
5.08% whey powder
0.26% sorbic acid
0.84% phosphoric acid
1.80% soyabean oil
6.67% vinegar
0.96% titanium dioxide dispersion
1.71% spices/garlic etc
74.04% deionised water
all by weight of this phase alone.

Example 1

The pre-mix of dispersed gel particles was mixed with the phase of admixed dressing ingredients using a pin-stirred C unit at a phase volume ratio of 55 to 45 to form a pourable, aqueous-continuous dressing having 55% of the volume of its aqueous phase occupied by the gel particles. The fat content of the dressing was 0.81 wt %, meaning that it can be legitimately termed zero-fat in many countries.

The in-mouth breakdown profile of this dressing was measured in accordance with the method used in comparative example A.

The resulting oral breakdown plot 6 is shown in FIG. 1.

Example 2

The pre-mix of dispersed gel particles was mixed with the admixture of dressing ingredients using a pin-stirred C unit at a phase volume ratio of 60 to 40 to form a pourable, aqueous-continuous dressing having 60% of the volume of its aqueous phase occupied by the gel particles. The fat content of the dressing was 0.72 wt %, meaning that it can be legitimately termed zero-fat in many countries.

The in-mouth breakdown profile of this dressing was measured in accordance with the method used in comparative example A.

The resulting oral breakdown plot 8 is shown in FIG. 1.

Example 3

The pre-mix of dispersed gel particles was mixed with the admixture of dressing ingredients using a pin-stirred C unit at a phase volume ratio of 70 to 30 to form a pourable, aqueous-continuous dressing having 70% of the volume of its aqueous phase occupied by the gel particles. The fat content of the dressing was 0.54 wt %, meaning that it can be legitimately termed zero-fat in many countries.

The in-mouth breakdown profile of this dressing was measured in accordance with the method used in comparative example A.

The resulting oral breakdown plot 10 is shown in FIG. 1.

Conclusion

In FIG. 1, from a comparison of the full-fat dressing plot 2 with plots 4 to 10, it is clear that plot 6 has an in-mouth breakdown profile which most closely resembles that of a full-fat dressing. Plot 4 has an in-mouth breakdown profile which least resembles that of a full-fat dressing.

It can be concluded that the pourable, aqueous-continuous dressings of the present invention comprising hard and soft gel particles have an in-mouth breakdown profile which resembles that of the full-fat dressing more closely than the in-mouth breakdown profile of the commercial zero-fat dressing does. The dressing of the present invention having an in-mouth breakdown profile which most closely resembled that of the full-fat dressing was the dressing having 55% of the volume of its aqueous phase occupied by the hard and soft gel particles.

Example 4

A creamy sauce product was prepared which contained hard alginate gel particles, from calcium alginate gel. The hard alginate particles were made by mixing 85 parts of (2%) sodium alginate solution with 15 parts of (1.32%) calcium chloride solution at 80° C. in a C-unit (shaftspeed 1400 rpm) before cooling under shear in a high speed A unit at 3800 rpm. The sheared alginate particles were then mixed with a continuous phase containing sunflower oil emulsified with egg, xanthan gum, salt and sucrose. 65 parts of the sheared gel phase were mixed with 35 parts of continuous phase to form the sauce and flavours and spices were added afterwards.

The total compositions were:

|  | % on product |
|---|---|
| Sheared alginate phase (65%) | |
| Na alginate (Manugel DMB) | 1.1 |
| $CaCl_2.2H_2O$ | 0.13 |
| Deionised water | 63.80 |
| Continuous phase (35%) | |
| Xanthan | 0.43 |
| NaCl | 1.23 |
| Sucrose | 1.91 |
| Dried egg powder | 0.40 |
| Sunflower oil | 8.00 |
| Lactic acid 90% | 0.06 |
| Deionised water | 22.97 |

The product resulted in a sauce product having an oral breakdown and mouthfeel comparable to a creamy full-fat sauce having a fat content of about 20%.

What is claimed is:

1. A pourable, edible emulsion comprising a continuous non-gelled aqueous phase and a dispersed phase of gel particles, wherein the gel particles occupy from 20 to 70% of the volume of the aqueous phase and the gel particles comprise hard particles of biopolymer gel and soft particles of biopolymer gel.

2. An emulsion as claimed in claim 1 wherein the gel particles occupy from 30 to 60% of the volume of the aqueous phase.

3. An emulsion as claimed in claim 1 wherein the ratio of hard particles to soft particles is from 4:1 to 1:4.

4. An emulsion as claimed in claim 3 wherein the ratio of hard particles to soft particles is from 2:1 to 1:2.

5. An emulsion as claimed in claim 1 wherein more than 90% of the hard particles have a diameter of from 0.1 to 30 microns.

6. An emulsion as claimed in claim 5 wherein more than 90% of the hard particles have a diameter of from 0.1 to 10 microns.

7. An emulsion as claimed in claim 1 wherein the soft particles have a mean diameter of from 2 to 50 microns.

8. An emulsion as claimed in claim 1 wherein the hard particles are gels of biopolymers selected from the group consisting of kappa-carrageenan, agar, protein, alginate, gellan and mixtures thereof.

9. An emulsion as claimed in claim 1 wherein the soft particles are gels of biopolymers selected from the group consisting of iota-carrageenan, gelatinised starch, pectin, protein, alginate, gellan and mixtures thereof.

10. An emulsion as claimed in claim 1 which has an elastic modulus of from 200 to 600 Pa.

11. A process for preparing a pourable, edible emulsion comprising the steps of:

a) preparing hard particles of biopolymer gel and soft particles of biopolymer gel; and b) admixing a non-gelled aqueous phase and the hard particles and the soft particles to form an emulsion comprising a continuous non-gelled aqueous phase and a dispersed phase of particles of biopolymer gel occupying from 20 to 70% of the volume of the aqueous phase.

12. A process as claimed in claim 11, wherein the soft particles of biopolymer gel are prepared by dispersing at least one soft-gelling biopolymer in water, heating to a temperature above the gel transition temperature of the biopolymer and cooling under shear to a temperature below the gel transition temperature of the biopolymer.

13. A process as claimed in claim 11, wherein the hard particles of biopolymer gel are prepared by dispersing at least one hard-gelling biopolymer in water, heating to a temperature above the gel transition temperature of the biopolymer and cooling under shear to a temperature below the gel transition temperature of the biopolymer.

* * * * *